(12) United States Patent
Klug

(10) Patent No.: US 11,927,876 B2
(45) Date of Patent: Mar. 12, 2024

(54) CAMERA APPARATUS FOR GENERATING AN IMAGE OF SURROUNDINGS

(71) Applicant: AUDI AG, Ingolstadt (DE)

(72) Inventor: Markus Klug, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 169 days.

(21) Appl. No.: 17/608,372

(22) PCT Filed: Apr. 30, 2020

(86) PCT No.: PCT/EP2020/062109
§ 371 (c)(1),
(2) Date: Nov. 2, 2021

(87) PCT Pub. No.: WO2020/225121
PCT Pub. Date: Nov. 12, 2020

(65) Prior Publication Data
US 2022/0229349 A1 Jul. 21, 2022

(30) Foreign Application Priority Data
May 3, 2019 (DE) ...................... 10 2019 206 354.3

(51) Int. Cl.
G03B 17/17 (2021.01)
G02B 6/42 (2006.01)
(Continued)

(52) U.S. Cl.
CPC ........... *G03B 17/17* (2013.01); *G02B 6/4214* (2013.01); *G02B 27/4205* (2013.01); *H04N 23/55* (2023.01)

(58) Field of Classification Search
USPC ........................................................ 396/267
See application file for complete search history.

(56) References Cited

U.S. PATENT DOCUMENTS 5,856,842 A 1/1999 Tedesco
6,118,589 A 9/2000 Angelo et al.
(Continued)

FOREIGN PATENT DOCUMENTS

DE 10 2017 217 193 A1 3/2019
DE 10 2019 206 354.3 5/2019
(Continued)

OTHER PUBLICATIONS

First Office Action dated Jan. 3, 2023 in related Chinese Patent Application No. 2020800330804 (7 pages).
(Continued)

*Primary Examiner* — Clayton E. LaBalle
*Assistant Examiner* — Warren K Fenwick
(74) *Attorney, Agent, or Firm* — STAAS & HALSEY LLP

(57) ABSTRACT

A camera apparatus includes a flexible carrier medium formed as a light guide and on which an input coupling region and an output region are disposed. Light, which is incident on the input coupling region from the surroundings, can be input into the carrier medium via the input coupling region. Internal reflection allows the light to be transmitted through the carrier medium from the input coupling region to the output coupling region. At the output coupling region, the transmitted light can be output from the carrier medium and be captured by an image capture device, which is disposed adjacent to the output coupling region.

12 Claims, 4 Drawing Sheets

(51) Int. Cl.
*G02B 27/42* (2006.01)
*H04N 23/55* (2023.01)

(56) References Cited

U.S. PATENT DOCUMENTS

| | | | | |
|---|---|---|---|---|
| 7,106,526 | B2* | 9/2006 | Tomita | H04N 23/55 |
| | | | | 396/335 |
| 10,156,681 | B2* | 12/2018 | Waldern | G02B 5/1823 |
| 10,234,696 | B2* | 3/2019 | Popovich | G02F 1/133606 |
| 2015/0277375 | A1* | 10/2015 | Large | G02B 6/005 |
| | | | | 359/34 |
| 2018/0205929 | A1* | 7/2018 | Fattal | H04N 13/243 |
| 2022/0203882 | A1* | 6/2022 | Klug | H04N 23/90 |
| 2022/0221772 | A1* | 7/2022 | Klug | G03B 13/36 |
| 2022/0230454 | A1* | 7/2022 | Klug | G06V 10/147 |
| 2022/0272258 | A1* | 8/2022 | Moll | G02B 13/06 |

FOREIGN PATENT DOCUMENTS

| | | |
|---|---|---|
| WO | 2010/057219 A1 | 5/2010 |
| WO | WO 2019063415 A1 | 4/2019 |
| WO | PCT/EP2020/062109 | 4/2020 |

OTHER PUBLICATIONS

Gotsch, D., et al: "Holoflex: Aflexible light field smartphone with a microlens array and a P-OLED Touch Screen," 2016, ACM, Human Media Lab, Queen's University (pp. 69-79, 11 pages).
Sims, D.C., et al: "Towards flexible sheet cameras: Deformable lens array with intrinsic optical adaption," Department of Computer Science, Columbia University (11 pages).
IPRP and Written Opinion in International Application No. PCT/EP2020/062109 dated Nov. 2, 2021 (7 pages).
International Search Report International Searching Authority in International Application No. PCT/EP2020/062109 dated Sep. 2, 2020 (16 pages including translation).
Germany Examination Report in German Application No. 10 2019 206 354.3 dated Dec. 18, 2019 (10 pages).

* cited by examiner

CAMERA APPARATUS FOR GENERATING AN IMAGE OF SURROUNDINGS

CROSS REFERENCE TO RELATED APPLICATIONS

This application is a U.S. national stage of International Application No. PCT/EP2020/062109, filed on Apr. 30, 2020. The International Application claims the priority benefit of German Application No. 10 2019 206 354.3 filed on May 3, 2019. Both International Application International Application No. PCT/EP2020/062109 and German Application No. 10 2019 206 354.3 are incorporated by reference herein in their entirety.

BACKGROUND

Described herein is a camera apparatus for generating an image representation of a surroundings or environment of the camera apparatus. A camera apparatus within the meaning of the disclosure is an apparatus for recording static or moving images, which represent an image representation of a surroundings or environment of the camera apparatus. The image representation can be output in the form of digital image data.

By way of example, a camera apparatus can be formed as a photographic camera or as a video camera, for example as a single-lens reflex camera, a digital camera, or a smartphone (mobile terminal). These tend to be quite bulky and require increased amounts of space as a result. As a result, it is usually cumbersome to transport such a camera apparatus.

These days, the miniaturization of optical systems, such as camera apparatuses for example, has also rendered it possible to provide flexible camera apparatuses. By way of example, U.S. Patent Application Publication No. 2018/0205929 A1 has described a multiple camera system, in which a plurality of individual cameras are arranged on a surface. Bending the surface allows a three-dimensional recording of the surroundings of the camera system to be created by use of the multiple camera system.

Moreover, the scientific publication "Holoflex: A flexible light field smartphone with a micro lens array and a P-OLED Touch Screen" (2016; Gotsch D; Zhang X.; Car-rascal J. P.; Vertegal R.; Human Media Lab; Queen's University) has described a flexible smartphone for recording images which can then be represented in three dimensions by use of a micro lens array. In this case, the recording can be implemented by way of an arrangement of three-dimensional depth cameras or an array of photodetectors, for example organic photodetectors.

Moreover, the scientific publication "Towards flexible sheet cameras: Deformable lens array with intrinsic optical adaption" (Sims, D. C.; Yue, Y.; Nayar, S. K.; Department of Computer Science, Columia University) has described a flexible lens arrangement or a flexible lens array made of silicone rubber, which is coupled to a two-dimensional array of detectors.

A disadvantage of the stated related art is that a multiplicity of individual components, i.e., individual cameras, are used for the image capture. As a result, the production of such image capture systems is frequently complicated and the systems are usually susceptible to outages on account of the plurality of individual components. Moreover, it is technically complex and requires increased computational power to merge the captured images of the many individual cameras to form a common image.

A further approach for providing a flexible camera has been disclosed in U.S. Pat. No. 6,118,589. A sawtooth-like arrangement of two sets of prisms is described in that case. When adjacent to one another, these can be rolled in a cylindrical shape. In particular, it is possible to record and display all-around or panoramic images as a result. However, grinding such sets of prisms is complicated, and so the production of the flexible camera with the two sets of prisms is time-consuming and costly.

SUMMARY

Described herein is a camera apparatus which can be transported in a compact form.

This may be achieved by the camera apparatus described herein. Advantageous developments are also disclosed in the following description, drawings, and the claims.

Described herein is a camera apparatus for generating an image representation of a surroundings or environment. By way of example, the image representation can be provided in the form of image data. To this end, the camera apparatus includes a carrier medium, which is realized as a plate made of plastic for example, and an image capture device, with the carrier medium transmitting light from the surroundings to the image capture device. Consequently, the carrier medium is formed as a light guide, i.e., it is a light-guiding medium. That is to say, the carrier medium can transmit light, which is input coupled into the carrier medium, to the image capture device by internal reflection, for example total internal reflection. The image capture device can capture the transmitted light, which is for example output coupled from the carrier medium, and generate image data therefrom. The image capture device can for example be implemented as an image sensor or camera, each with or without an imaging optical unit, such as a lens or a lens system.

To input couple or output couple the light, an input coupling region and an output coupling region are arranged on the carrier medium, i.e., the carrier medium carries the input coupling region and the output coupling region. In this case, the input coupling region has a first deflection structure which may be realized as a diffraction grating, for example. Further, the output coupling region has a second deflection structure which may likewise be realized as a diffraction grating. Consequently, the light from the surroundings can be deflected or diffracted at the first deflection structure of the input coupling region and can be input coupled into the carrier medium. Accordingly, the light transmitted by the carrier medium can be deflected or diffracted at the second deflection structure and can be output coupled from the carrier medium.

Expressed differently, the input coupling region has a first deflection structure which is formed to input couple light, which is incident on the first deflection structure from the surroundings, into the carrier medium. The carrier medium is formed to transmit the input coupled light from the input coupling region to the output coupling region by use of internal reflection. Finally, the output coupling region has a second deflection structure, which is formed to output couple the transmitted light, which is incident on the second deflection structure, from the carrier medium.

To capture the light that has been output coupled from the carrier medium, the image capture device is adjacent to the output coupling region. As described above, the image capture device is formed to capture the light output coupled from the carrier medium and provide the light in the form of image data. In this case, the image data are correlated with the incident light from the surroundings.

To facilitate the compact transport of the camera apparatus, the carrier medium is formed to be flexible at least in regions, at least in the region of the input coupling region. Expressed differently, the carrier medium in the region of the input coupling region can be formed to be flexible or bendable, either as a whole or in regions. For example, the entire input coupling region, for example the entire carrier medium, can be formed to be flexible and hence be flexibly deformable. Thus, the carrier medium can have at least one flexible portion. This allows a flexible camera apparatus to be provided.

This leads to the advantage that the camera apparatus can easily be folded up or rolled up for transportation purposes. Then, in the folded up or rolled up state, the camera apparatus requires less space than in a folded or unrolled state. Below, the terms folded or rolled are used synonymously with folded up or rolled up. Similarly, the terms spread out or unfurled could be used as synonyms for unfolded or unrolled.

For transportation purposes, the camera apparatus can consequently be stowed in for example a trouser pocket of a user in the rolled or folded state. Moreover, as a result of its flexibility, the camera apparatus is more resilient in the case of compressive and tensile loads or impacts, and is consequently advantageously more protected than an inflexible or rigid variant. As a result, the user can for example sit down with the folded camera apparatus in the trouser pocket, without the camera apparatus being damaged. To capture or generate an image representation or an image of the surroundings, the camera apparatus can then be unfolded or unrolled and thus brought into a planar or areal form. The aforementioned unrolled or unfolded state can consequently also be referred to as planar or areal state.

Moreover, as a result of requiring only one single image capture device, for example a single camera, to capture the image, less computational power can be is required and the manufacturing outlay to produce the camera apparatus is lower than in the related art described above.

Advantageously, the carrier medium can be formed in a dimensionally stable fashion. By way of example, in a rest state, i.e., a non-deformed state, the carrier medium can be formed as a plate or as a planar areal element as described above. However, from the rest state, the carrier medium can be flexibly deformed, i.e., for example folded or rolled, as described above by way of an exertion of force or an action of force. For example, the carrier medium can also be formed to be elastic such that it independently deforms back into the rest state, i.e., independently unfolds or unrolls, from the rolled or folded state for example if the action of force is discontinued. Alternatively, the carrier medium can also be formed in a plastic fashion. That is to say, it can remain in the deformed state following deformation.

In another configuration, the carrier medium can be formed in a limp or dimensionally unstable fashion, for example, in the rest state instead of being dimensionally stable. Consequently, the carrier medium can only be brought into the described planar state by stretching, for example, and represent the planar and areal element as a result.

To fasten the image capture device to the carrier medium the image capture device can be for example adhesively bonded to the carrier medium or plugged onto the carrier medium. Alternatively, the carrier medium can also be clamped in a holding device of the image capture device. For example, the image capture device can be formed as an image sensor, for example a CCD (charge-coupled device) sensor or as a CMOS (complementary metal oxide semiconductor) sensor. When the image capture device is designed as an image sensor, the carrier medium at which the input coupling region and the output coupling region are arranged can additionally take on the task of an objective, that is to say of an imaging optical unit. Alternatively, the image capturing apparatus can also be implemented in the form of a camera or photographic camera, for example a micro-camera, such as is embodied in a smartphone, for example, with its own imaging optical unit.

Also described herein are further embodiments resulting in additional advantages.

An embodiment provides for the camera apparatus to include a stowing device, at which the carrier medium is arranged and which is formed to deform at least a flexible portion of the carrier medium. By way of example, the stowing device can be formed as a pneumatically or hydraulically operated adjustment mechanism or as a shape memory structure that deforms depending on the temperature. For example, the stowing device can be set up to deform the at least one flexible portion of the carrier medium on the basis of a control signal.

Consequently, the stowing device is designed to alternate the carrier medium between a compact position or compact position, in which the carrier medium is folded up or rolled up, and an operational position, in which the carrier medium is unfolded or unrolled. Expressed differently, the stowing device can position the carrier medium either in the compact position or in the operational position. Consequently, the stowing device can switch between the folded or rolled state and the planar state of the carrier medium or the camera apparatus. As a result of the carrier medium being able to be arranged in planar or areal fashion in the operational position by use of the stowing device, the operational position can consequently describe the planar state of the carrier medium. By contrast, the carrier medium can be arranged unevenly or irregularly in the compact position as a result of the stowing device, as a result of which the compact position can consequently describe the rolled or folded state of the carrier medium.

Consequently, the carrier medium in the operational position has a larger light incidence surface for the light, which is incident on the input coupling region from the surroundings, than in the compact position. The light incidence surface means an effective or absolute surface of the carrier medium, for example of the input coupling region, which is illuminated or irradiated by the light from the surroundings. Consequently, the light incidence surface can be maximized in the operational position in view of the input coupling region. Expressed differently, an absolute external dimension of the camera apparatus can be altered by use of the stowing device. For example, the absolute external dimension in the compact position is smaller than the absolute external dimension in the operational position. Consequently, a desired field of view in the surroundings can be imaged or represented correctly by use of the camera apparatus, i.e., for example, in focus and without distortion, for example only in the operational state. However, provision can advantageously also be made for at least a portion of the surroundings, i.e., an excerpt of the desired field of view, to be able to be imaged or represented correctly by use of the camera apparatus, i.e., for example, in focus and without distortion, even in the compact position.

The advantage arising as a result is that the camera apparatus can position itself automatically or autonomously in the operational position or in the compact position by use of the stowing device, depending on the application.

A further embodiment provides for the control device to include a support structure which has a material formed to lock the flexible portion of the carrier medium in the operational position at a first value of a temperature and/or an electric field and/or a magnetic field and to lock the flexible portion in the compact position at a second value.

Expressed differently, the support structure can be formed to deform on the basis of a temperature and/or an electric and/or magnetic field and, as a result, also bring about the deformation of the carrier medium, for example the flexible portion of the carrier medium. Consequently, the carrier medium can be locked or kept in the operational position or in the compact position by setting the temperature, the electric field and/or the magnetic field.

As a material, the support structure can include for example a bimetal, a shape memory alloy, a shape memory polymer or an electrochemical or piezoelectric material, or magnetic nanoparticles.

Additionally, the stowing device can also include a driving device for the support structure, by use of which the corresponding temperature value and/or the respective value of the electric or magnetic field can be set such that the support structure deforms. By way of example, a heating wire and/or an electromagnet and/or a capacitor can be provided, which are driven by a microcontroller by use of a control signal.

A further embodiment provides for the stowing device to include a guide mechanism which is set up to roll up or fold up the carrier medium for positioning in the compact position and to unroll or unfold the carrier medium for positioning in the operational position.

Consequently, the stowing device can include mechanical components for rolling and unrolling or folding and unfolding the carrier medium, which components are formed as a guide mechanism. Additionally, provision can also be made for a driving device for driving an actuator device of the guide mechanism in order to deform or move the carrier medium, for example the at least one flexible portion of the carrier medium, by use of the guide mechanism. The driving device can for example be based on at least one electric motor.

By way of example, the guide mechanism may include mechanical articulated arms, which can be driven hydraulically or pneumatically or electrically for example in order to position the carrier medium in the desired position. Consequently, the guide mechanism can be embodied as the above-described pneumatically or hydraulically operated adjustment mechanism, for example.

Alternatively, the guide mechanism may include rails and/or cords, for example, wherein the carrier medium can be rolled up or unrolled along the rails with the aid of the cord. The guide mechanism can then be formed, in a manner of speaking, as a rolling up or unrolling device, to which the carrier medium has been fastened or attached. By use of a motor and appropriate driving, the carrier medium, and hence also the camera apparatus, can then be positioned in the operational position or in the compact position.

A further embodiment provides for the carrier medium to be formed as a plate made of polymer or as a film, for example in a transparent fashion. Consequently, the flexibility can be provided by a material of the carrier medium. By way of example, the carrier medium can be formed as a covering film for a trim or an object. By way of example, a mean material strength or thickness of the carrier medium can range between 1 millimeter and 10 millimeters, for example between 0.3 millimeters and 0.8 millimeters, and may be 0.5 millimeters, for example.

As described herein, a film can be understood to mean an areal construct that is dimensionally unstable. That is to say, a film can absorb tensile forces only in two spatial directions, in which the areal construct extends, but it cannot absorb any compressive forces or bending moments. Consequently, such a film is, for example, dimensionally unstable in the rest state. A mean material strength of such a film is for example significantly smaller than its length and width in this case. For example, the mean material strength, which is also referred to as height or thickness, can be less than 5 percent of the length and/or less than 5 percent of the width.

By contrast, a plate can be understood to mean an areal construct which is dimensionally stable. By way of example, a plate can have a cuboid or cylindrical structure, the mean material strength or thickness or height of which is significantly smaller than its length and/or width or its diameter. For example, the mean material strength can be less than 20 percent of the length and/or less than 20 percent of the width. However, the mean material strength may be less than 10 percent of the length and/or less than 10 percent of the width, and may be less than 5 percent of the length and/or less than 5 percent of the width. Below, the terms longitudinal side or longitudinal edge or broadside or broad edge are also used as synonyms for the length and the width. A cuboid plate usually has two opposite faces, which are enclosed by the respective longitudinal sides and broadsides. Below, these faces are also referred to as surfaces of the plate. Accordingly, the remaining four faces of the plate, which are enclosed by the longitudinal and vertical sides or by the broadsides and vertical sides are referred to as side faces. By contrast, if the plate is formed in cylindrical fashion for example, the two bases of the plate can be referred to as surfaces and the lateral face can be referred to as a side face.

A further embodiment provides for the input coupling region and the output coupling region to have, as a deflection structure, at least one optical grating, for example a surface holographic grating or a volume holographic grating. In this context, the camera apparatus is referred to as a HoloCam here.

An optical grating, also referred to as a diffraction grating, and the mode of action and production method thereof are well known. In principle, an optical grating can be formed as at least partly periodic structures, so-called grating structures, in a substrate. By use of the grating structure, an optical grating can bring about, through the physical effect of diffraction, light guidance, as is known, for example, from mirrors, lenses, or prisms. If light is, that is to say if light rays are, incident on the optical grating, wherein the incident light rays for example, satisfy the Bragg equation, the light rays are diffracted or deflected by the optical grating. The light can thus be guided for example by interference phenomena of the light rays diffracted by the optical grating. The deflection structure of the input coupling region or the output coupling region can accordingly also be referred to as a diffraction structure.

For example, an optical grating can be embodied to be direction-selective or angle-selective with respect to the incident light. Thus, only light, for example a portion of the light, that is incident on an optical grating from a predetermined direction of incidence, for example at a predetermined angle, can be deflected. Light, for example, a portion of the light, that is incident on the optical grating from a different direction is for example not deflected, or is less deflected, the greater the difference to the predetermined direction of incidence is. The light portion that deviates from the predetermined direction of incidence or optimum direction of incidence can consequently propagate for example unhindered through the substrate with the optical grating.

Additionally or alternatively, an optical grating can also be embodied to be wavelength-selective or frequency-selective. Thus, only light, for example a first portion of the light, having a predetermined wavelength can be deflected or diffracted by the optical grating at a specific angle of diffraction. Light, for example a second portion of the light, having a wavelength other than the predetermined wavelength is for example not deflected, or is less deflected, the greater the difference to the predetermined wavelength is. The second light portion that deviates from the predetermined wavelength or optimum wavelength can consequently propagate for example unhindered through the substrate with the optical grating. In this way, for example, at least one monochromatic light portion can be split off from polychromatic light that is incident on the optical grating. The deflection effect for the optimum wavelength is advantageously at a maximum and decreases toward longer and shorter wavelengths, for example in the manner of a Gaussian bell, or becomes weaker. For example, the deflection effect only acts on a fraction of the visible light spectrum and/or in an angular range of less than 90 degrees.

An optical grating can be produced for example, by use of light exposure of a substrate, that is to say for example photolithographically or holographically. In this context, the optical grating can then also be referred to as a holographic or holographic-optical grating. Two types of holographic-optical gratings are known: surface holographic gratings (in short: SHG) and volume holographic gratings (in short: VHG). In the case of a surface holographic grating, the grating structure can be generated by optically deforming a surface structure of the substrate. Due to the modified surface structure, incident light can be deflected, for example reflected. Examples of surface holographic gratings are so-called sawtooth or blazed gratings. In contrast to this, the grating structure in the case of volume holographic gratings can be incorporated into the entire volume or part of the volume of the substrate. Surface holographic gratings and volume holographic gratings are usually frequency-selective. However, optical gratings that can diffract polychromatic light are also known. These are called multiplexed volume holographic gratings (in short: MVHG) and can be produced, for example, by changing the periodicity of the grating structure of an optical grating or by arranging a plurality of volume holographic gratings one behind the other.

A polymer, for example a photopolymer, or a film, for example a photosensitive film, for example made of plastics material or organic substances, may be suitable as the material of the substrate for incorporating an optical grating. In order to use such substrates for the flexible camera apparatus, it should additionally be noted that the material, for example in substrate form, has flexible and optical wave-guiding properties. Substrates that have a deflection structure for diffracting light, for example in the form of an optical grating, can also be referred to as holographic optical elements (HOE).

A further embodiment provides for the input coupling region and the output coupling region to be formed in one piece with the carrier medium. Consequently, the input coupling region and the output coupling region can for example be incorporated directly in a surface structure of the carrier medium. That is to say, the deflection structure can be for example etched or lasered into the surface of the carrier medium. Thus, the carrier medium itself can be embodied in the form of a HOE.

A further embodiment provides for the carrier medium to be formed as a separate element from the input coupling region and the output coupling region. That is to say, the input coupling region, output coupling region and carrier medium can be formed separately. By way of example, the input coupling region and the output coupling region can form at least one first element and the carrier medium can form a second element which adjoins the first element. The input coupling region and the output coupling region can thus be formed in at least one HOE. For example, the input coupling region and the output coupling region can be formed in different sections of a holographic film or plate. To fasten the film or plate to the carrier medium, the film or the plate can be adhesively bonded to the carrier medium. Alternatively, the holographic film can also be embodied in the form of an adhesive film and adhere to the surface of the carrier medium directly, that is to say without adhesive, by use of molecular forces.

A further embodiment provides for an area of the input coupling region to be formed to be greater than an area of the output coupling region. For example, the input coupling region can be larger than the output coupling region by a factor of 2.

To deflect the light from the surroundings, the input coupling region can have here a focusing structure as a first deflection structure, by use of which the light incident from the surroundings is deflected via the carrier medium to the output coupling region in focused fashion. The optical grating can be formed accordingly as a focusing grating. Furthermore, the output coupling region can have a scattering structure as a second deflection structure, by use of which the focused light, for example a beam path of the light, is parallelized when leaving the carrier medium during the deflection from the scattering structure in order to be captured by the image capture device. The optical grating can be formed accordingly as a scattering grating.

Consequently, the light from the surroundings is focused such that a light intensity of the output coupling region or a light incidence region of the image capture device can be increased.

To realize a focusing grating or a scattering grating, an inhomogeneous grating structure, for example a piecewise aperiodic grating structure, for example, can be worked into the described substrate. Alternatively, a plurality of volume gratings with the same or different grating structures can also be arranged or connected next to one another or behind one another.

As described herein, the disclosure also includes the combinations of the features of the described embodiments.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
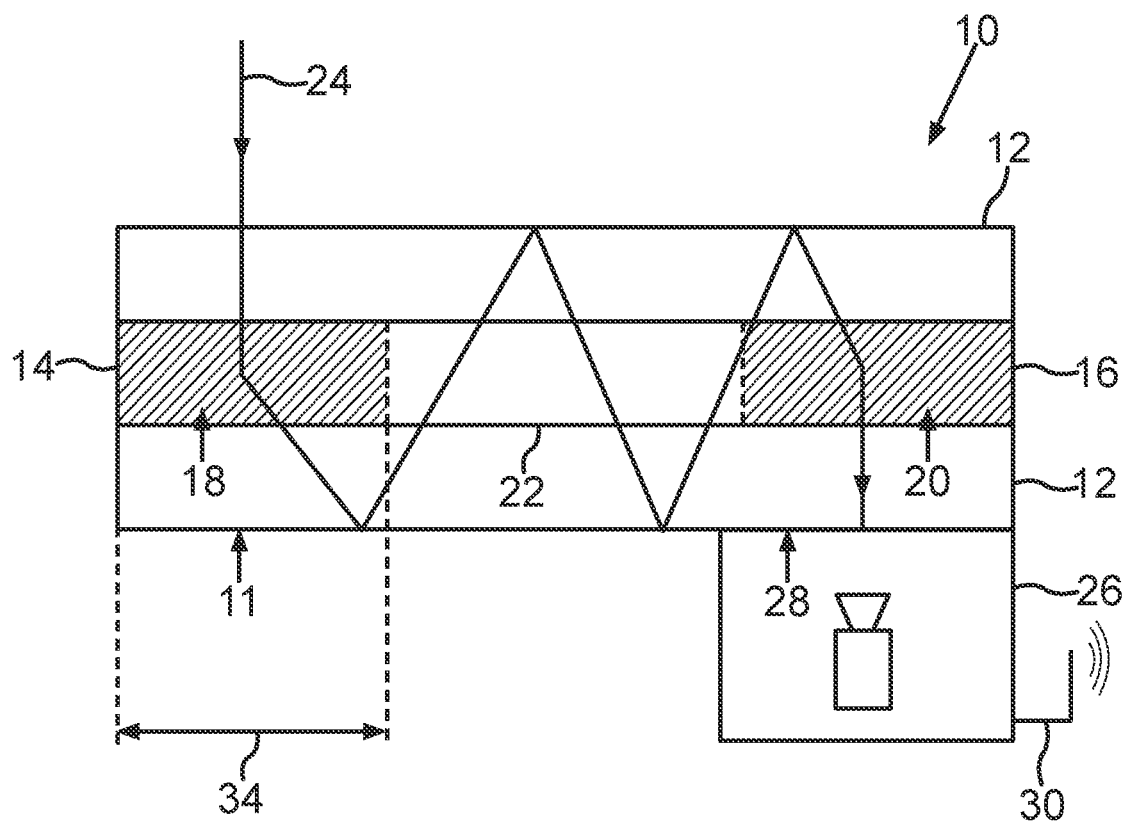
FIG. 1 is a schematic illustration of an advantageous configuration of a flexible camera apparatus in an operational position.

Reference will now be made in detail to example embodiments, the examples of which are illustrated in the accompanying drawings, wherein like reference numerals refer to like elements throughout.

The embodiments discussed below are example embodiments. In the example embodiments, the described components of the embodiments each represent individual features that should be considered independently of one another and also develop the disclosure in each case independently of one another. The disclosure is therefore also intended to include combinations of the features of the embodiments other than those illustrated. Furthermore, the described embodiments may also be supplemented by further features that have already been described.

In the drawings, identical reference signs each denote elements of identical function.

FIG. 1 shows an example embodiment of a camera apparatus 10 for generating an image representation of a surroundings of the camera apparatus 10. FIG. 1 shows a sectional image of the camera apparatus 10, in which the camera apparatus 10 is illustrated with a cut along an axis of longitudinal extent.

As a carrier medium 12, the camera apparatus 10 in FIG. 1 includes, e.g., two polymer plates which are made of flexible polymethyl methacrylate (PMMA), for example, and which are formed as light guides. Furthermore, the camera apparatus 10 also includes a holographic optical element 22, abbreviated HOE below, which may be formed as a transparent photopolymer film, for example. On account of using a HOE, the camera apparatus 10 can also be referred to as a HoloCam. In this case, HOEs use the physical effect of diffraction in order to bring about different variants of light guidance. In FIG. 1, carrier medium 12 and HOE 22 are illustrated as being formed from separate elements which are constructed in a sandwich construct in order to form the camera apparatus 10. The two polymer plates of the carrier medium 12 form capping layers and the HOE 22 forms the core of the camera apparatus 10. The carrier medium 12 in a sandwich construct is only one example embodiment, however.

An input coupling region 14 and an output coupling region 16 are arranged on the carrier medium 12 in FIG. 1. In this case, input coupling region 14 and output coupling region 16 are formed in different sections, for example along a direction of longitudinal extent of the HOE 22. The input coupling region has a first deflection structure 18 which is formed to input couple light 24, which is incident on the first deflection structure 18 from the surroundings, into the carrier medium 12 and in the process deflect the light by use of diffraction at a diffraction grating structure. The input coupled light 24 is then reflected by use of internal reflection, for example total-internal reflection, at the interfaces of the carrier medium aligned to the surroundings and consequently transmitted from the input coupling region 14 to the output coupling region 16. For example, the polymer plates and the HOE have the same refractive index such that light refraction at the interfaces between HOE and polymer plates is avoided. In a manner analogous to the input coupling region 14, the output coupling region 16 also has a deflection structure, for example the second deflection structure 20, which is formed to output couple the transmitted light 24, which is incident on the second deflection structure 20, from the carrier medium 12.

An image capture device 26 is arranged at the output coupling region 16. The image capture device 26 has a light incidence region 28, which overlaps, for example in full or at least in regions, with the output coupling region, for example a surface of the output coupling region. The image capture device 26 is embodied to capture the light that was deflected at the second deflection structure 20 and consequently output coupled from the carrier medium 12 and to provide the light in the form of image data which are correlated with the incident light 24 from the surroundings. To this end, the image capture device 26 can have a communications device 30 for example, by use of which the image data can be transferred, for example to a display device, in a wireless or wired fashion. Alternatively, the image capture device 26 can itself also include a display device such that a user can directly observe the generated image representation of the surroundings by way of the camera apparatus 10, for example the display device of the image capture device 26.

In FIG. 1, the carrier medium 12 is formed as a separate element to the input coupling region 14 and the output coupling region 16, i.e., for example, to the HOE 22, which includes the input coupling region 14 and the output coupling region 16. In an alternative embodiment of the camera apparatus 10, the input coupling region 14 and the output coupling region 16 can also be formed in one piece with the carrier medium 12. In this case, the input coupling region 14 and the output coupling region 16 can be worked into the carrier medium, for example into a surface of the carrier medium, in the form of a blazed grating for example. It is also possible to apply the input coupling region 14 and the output coupling region 16 to the carrier medium 12 on the outside, for example by adhesively bonding a respective HOE thereon.

In FIG. 1, the first and the second deflection structure 18 and 20 can be formed as optical gratings, for example as a surface holographic grating or a volume holographic grating. The light guidance at such optical gratings is implemented on the basis of interference effects for example. Light 24 that strikes the grating is diffracted by a grating structure of the grating and forms an interference pattern. Optical gratings can be formed in frequency-selective or wavelength-selective fashion for example. This is because light of different wavelengths can be deflected to a different extent by optical gratings. For example in the case of volume holographic gratings, this property can be used so that only light of a certain wavelength or of a certain wavelength range is diffracted or deflected at the grating structure.

If such a volume grating is used for the camera apparatus 10 as shown in FIG. 1 then only light of one wavelength or one wavelength range, which for example is made up of a range or a portion of the visible light, would be deflected at the first deflection structure 18 in such a way that it can be transmitted by the carrier medium 12 to the output coupling region 16 by use of total-internal reflection. Light located outside of this range of the spectrum of light would transmit through the input coupling region 14 of the camera apparatus 10 without deflection, or at least virtually without being deflected at the first deflection structure 18. Hence, the camera apparatus 10 would be transparent at least to a portion of the visible light.

To avoid the effects of scattered light from the surroundings on the image representation of the surroundings generated by use of the camera apparatus 10, provision can for example be made for the carrier medium 12 to have a light-transmissive form only in the region of a light input coupling surface and a light output coupling surface. Here, the light input coupling surface describes a surface through which the light is input coupled into the carrier medium 12 from the surroundings. Accordingly, the light output coupling surface describes a surface through which the light is output coupled from the carrier medium 12. To this end, a light opaque lacquer may have been applied to the carrier medium 12 or a film may have been adhesively bonded thereto, for example in regions.

Furthermore, provision is made for the carrier medium 12 to have a fully or partly flexible form in the region of the input coupling region 14. The carrier medium 12 or the camera apparatus 10 can consequently have at least one flexible portion 34. To ensure the flexibility of the camera apparatus 10, the input coupling region 14, for example the HOE 22, can also have a flexible form. Carrier medium 12 and/or HOE can be accordingly formed from a material which is flexibly deformable, for example elastic. As a result, the camera apparatus 10 can be rolled up and/or folded up, for example for transportation purposes, and so the camera apparatus 10 could be stored or stowed particularly easily. On account of its flexible embodiment it would also be more resistant in relation to impacts, compressive load or tensile load.

The rolled up or folded up state of the camera apparatus 10 is also referred to here as compact position 13, which may be provided for transportation. In contrast thereto, the unrolled or unfolded state of the camera apparatus 10, as illustrated in FIG. 1, will be referred to here as operational position 11, in which the operation for capturing the surroundings is provided. In the operational position 11, the camera apparatus 10, i.e., for example, the carrier medium 12 and the HOE 22, can have a planar arrangement.

For example, the operational position 11 can be distinguished in that the carrier medium 12 in the operational position has a larger light incidence surface for the light 24, which is incident on the input coupling region 14 from the surroundings, than in the compact position 13. For example, provision can be made for light to be transmitted from the input coupling region 14 to the light incidence region 28 of the image capture device 26 only in the operational position 11 such that the image data correlated to the light 24 can represent a correct image representation of the surroundings. By way of example, in a different position to the operational position 11, the image could consequently be imaged out of focus or in a distorted fashion.

Figure 2:
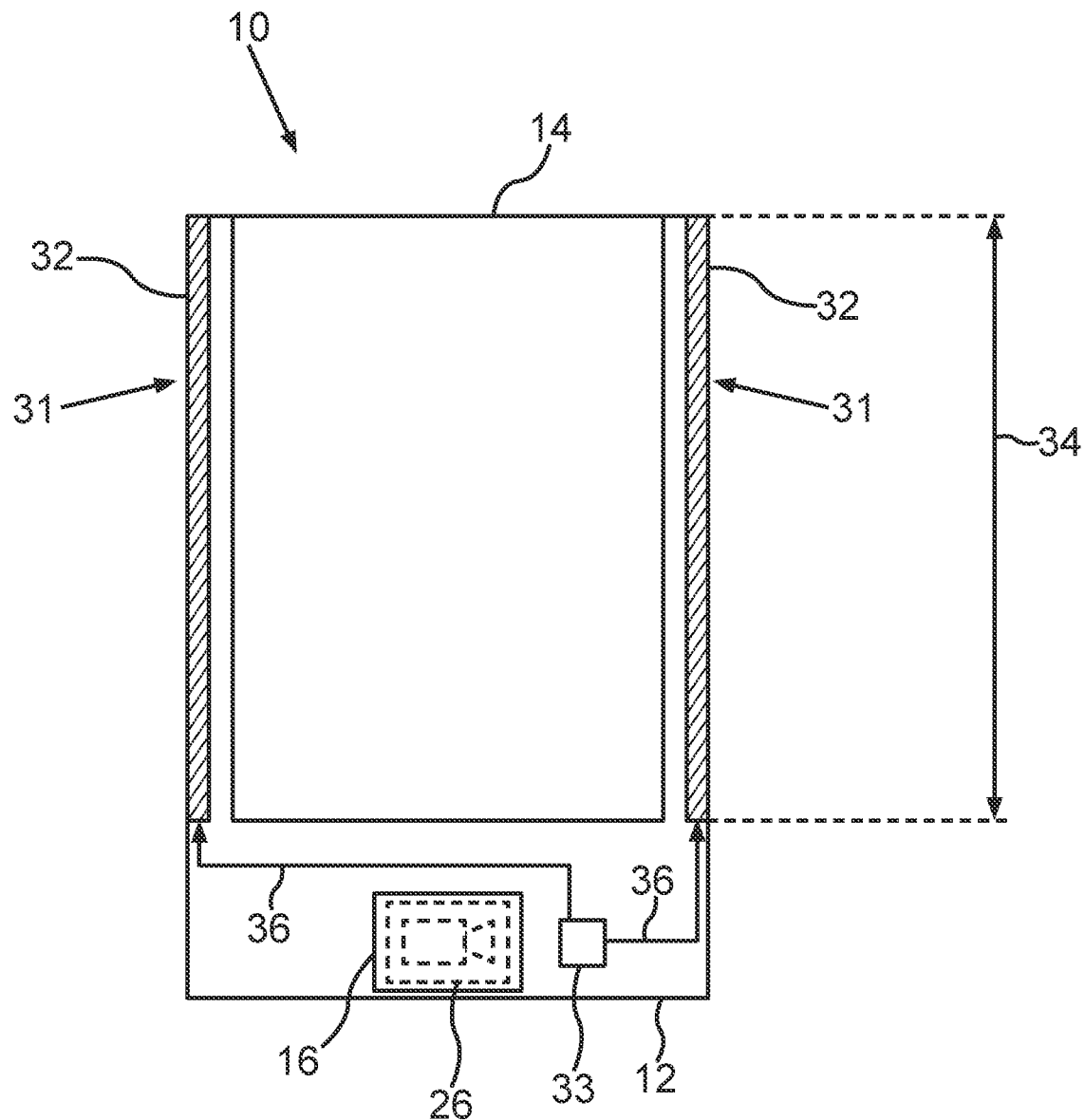
FIG. 2 is a schematic illustration of the flexible camera apparatus with a stowing device which is formed to position the carrier medium in an operational position or in a compact position.

FIG. 2 shows a plan view of the camera apparatus 10 as described in FIG. 1. However, in FIG. 2, the input coupling region 14, for example a surface of the input coupling region 14, is larger than the output coupling region 16, for example a surface of the output coupling region 16. The size ratio can be greater than a factor of 2. In this case, the first deflection structure 18 of the input coupling region 14 can be formed as a focusing structure or focusing grating such that the incident light 24 is not only diffracted but also focused. Accordingly, the second deflection structure 20 can be embodied as a scattering structure in order to scatter the light 24 again, Fig. to parallelize the light, for the purposes of the transmission thereof to the light incidence region 28 of the image capture device 26. This can increase a light intensity of the light which is output coupled by way of the output coupling region 16 or which is captured by the light incidence region 28 of the image capture device 26. In comparison with FIG. 1, the flexible portion 34 of the carrier medium 12 has also been enlarged by the enlarged input coupling region.

Furthermore, the camera apparatus 10 in FIG. 2 also includes a stowing device 31, which is formed here as a support structure 32 in an example fashion. As shown in an example fashion in FIG. 2, the support structure 32 can be formed as two longitudinal struts which are attached to two opposing longitudinal edges of the carrier medium 12 along a direction of longitudinal extent of the carrier medium 12. For example, the support structure 32 in FIG. 2 is applied along the longitudinal edges of the carrier medium 12 only in the region of the input coupling region 14. This region consequently represents the flexible portion 34 of the camera apparatus 10.

In this case, the support structure 32 can have a material which is formed to lock or hold the flexible portion 34 of the carrier medium 12 in the operational position 11 or in the compact position 13 depending on a temperature and/or an electric field and/or a magnetic field. To this end, the support structure 32 can be formed for example as a shape memory alloy or as a shape memory polymer with a two-way memory effect. As a result of the two-way memory effect, the shape memory alloys or the shape memory polymer can remember two shapes, for example one at a higher temperature and one at a lower temperature. Alternatively, the deformation of the shape memory material can also be caused by a change in a magnetic field. By way of example, nickel titanium, Nitinol, nickel titanium cop-per or copper zinc aluminum can be used as shape memory alloys. By contrast thereto, the support structure can also be formed as a bimetal or piezoelectric material, which can change its shape on the basis of a field strength of an applied electric field.

To realize the deformation with the aid of the support structure 32, the stowing device 31 in FIG. 2 also includes a driving device 33 for the support structure 32. By way of the driving device 33 it is possible to provide a driving signal 36 for the support structure 32, wherein the support structure 32 changes its shape on the basis of the control signal 36. As a result of the support structure 32 being attached to the carrier medium 12 it is consequently also possible to adapt the shape of the carrier medium 12. By way of example, an electric current can be provided for the support structure 32 by the driving device 33 as a control signal 36. The support structure 32 can be heated by the electric current. By way of example, the support structure 32 can be heated to a first temperature value or into a first temperature range, in which the support structure adopts a planar form and consequently the carrier medium 12 can be positioned and kept in the operational position 11. In the operational position 11, the camera apparatus 10 with the carrier medium 12 then has a plane and areal form, for example, in order to be able to offer a maximum light incidence surface for the input coupling region 14. By contrast, if the electric current is switched off, the temperature of the support structure 32 can slowly drop until it has fallen into a second temperature range or has reached a second value of the temperature. In this second temperature range or once the second value of the temperature has been reached, the support structure 32 can roll up or be folded together such that the flexible portion 34 of the carrier element 12 is then positioned and held in the compact position 13. Consequently, in its first shape, the support structure 32 can arrange the flexible portion 34 of the carrier medium 12 in an areal and planar fashion in the operational position 11 and, in its second shape, the flexible portion 34 of the carrier medium can be rolled up or folded up and consequently be positioned in the compact position 13.

Figure 3:
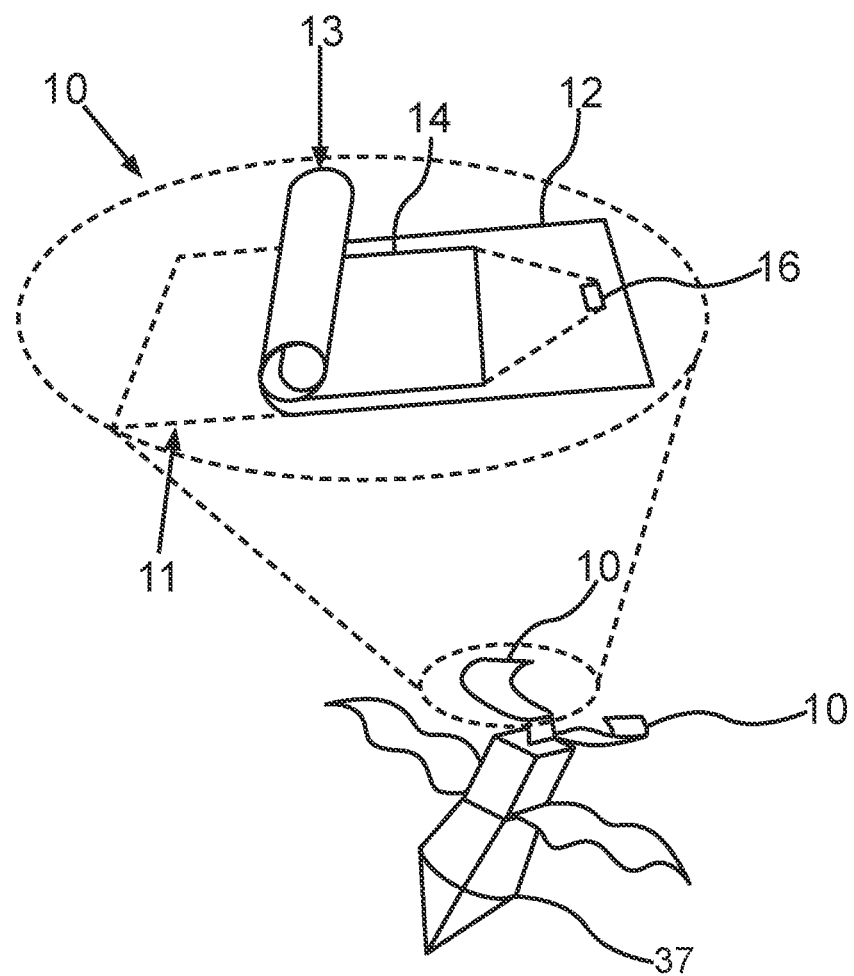
FIG. 3 is a schematic illustration of the flexible camera apparatus to be used for an image capture with a satellite.

FIG. 3 shows a possible use of the flexible camera apparatus 10 for a satellite 37. By way of example, two camera apparatuses 10 are arranged on the satellite 37 in FIG. 3 and the camera apparatuses can be unfolded or unrolled when required in order to capture images from the surroundings of the satellite 37. The camera apparatuses 10 can consequently be positioned in the operational position 11 for recording images and in the compact position 13 for transportation.

Figure 4:
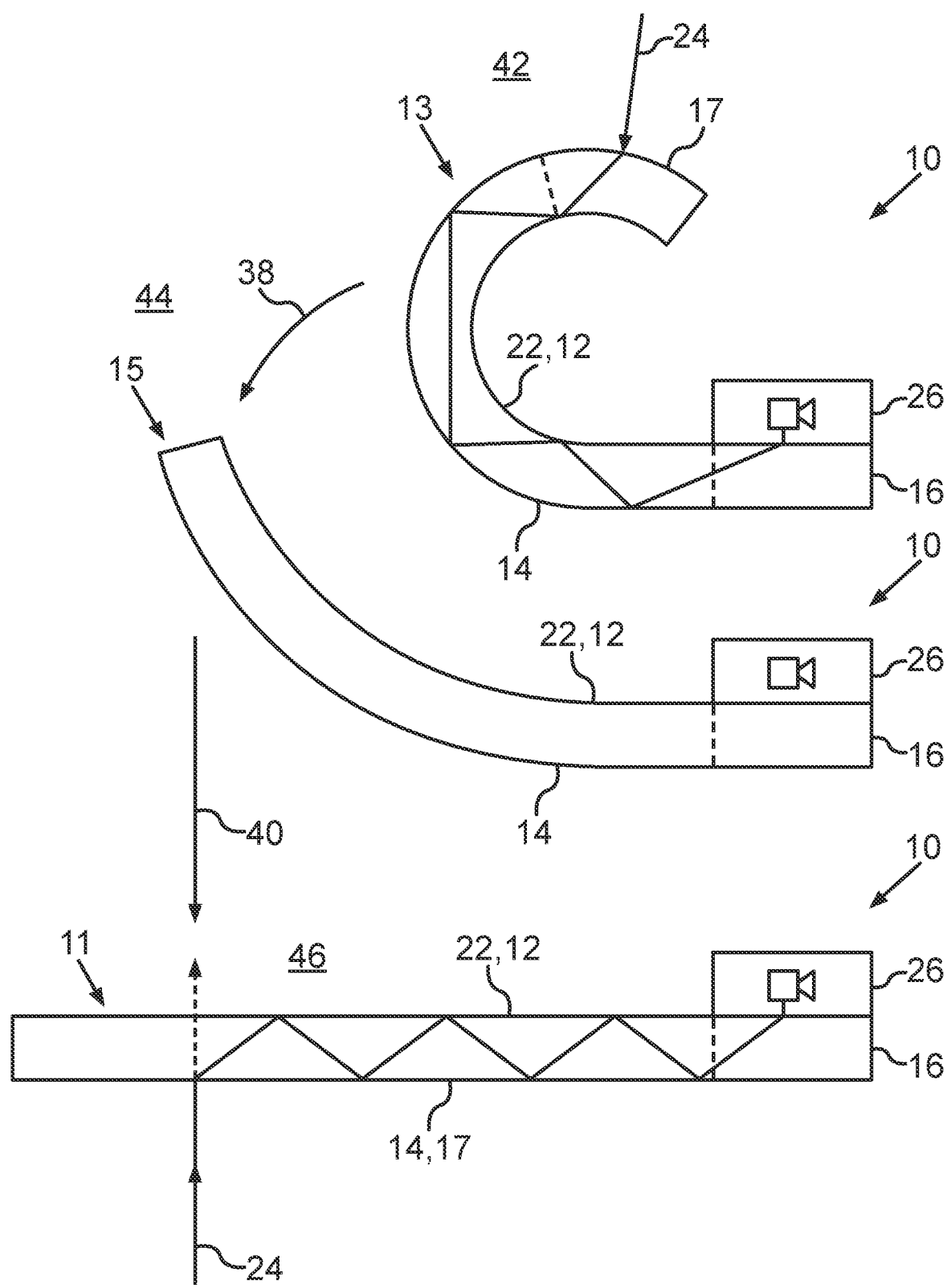
FIG. 4 is a schematic illustration of the flexible camera apparatus, in which an unrolling procedure for changing from the compact position to the operational position is illustrated in an example fashion.

Finally, FIG. 4 shows a schematic illustration of a side view of the flexible camera apparatus 10, in which an unrolling procedure for changing from the compact position 13 to the operational position 11 is illustrated in an example fashion. To this end, the flexible camera apparatus is shown three times in different positions 13, 15, 11 in FIG. 4. In a first illustration 42, the camera apparatus 10 in FIG. 4 is in the compact position 13. To this end, the camera apparatus 10 and for example the carrier medium 12 with the HOE 22 is partly rolled up. The portion of the carrier medium 12 which includes the input coupling region 14 forms approximately a semicircle in the shown side view of the first illustration 42 of the camera apparatus 10. Consequently, a light incidence surface 17 for light from the surroundings is smaller than the surface of the input coupling region 14. Even though the carrier medium is in the compact position 13, light 24 which is incident on the input coupling region 14 from the surroundings can nevertheless be transmitted to the image capture device 26 for the purposes of generating the image representation of the surroundings, as shown in the illustration 42. However, in the process, only light 24 which is incident in the region of the light incidence surface 17 of the input coupling region 14 is for example input coupled into the carrier medium in such a way that the light 24 is transmitted to the image capture device 26 by use of internal reflection in the carrier medium 12. Light that is incident on the input coupling region 14 from outside of the light input coupling surface 17, by contrast, is not transmitted up to the image capture device 26 in the compact position 13 on account of the curvature or the bending radius of the carrier medium 12. Instead, this light is output coupled from the carrier medium 12 for example before the output coupling region 16 is reached, for example because a critical angle of total-internal reflection is undershot when the light rays of the light are incident.

To increase the light incidence surface 17, and hence also a field of view, the camera apparatus 10 can be brought from the compact position 13 into an intermediate position 15 by way of a first unrolling operation 38 and into the operational position 11 by way of a second unrolling operation 40. The intermediate position 15 of the flexible camera apparatus 10 is shown in the second illustration 44 of FIG. 4. The operational position 11 is illustrated in the third illustration 46. In the operational position 11, the camera apparatus 10 has a planar or areal arrangement as described, and so an increased field of view can be captured in contrast with the compact position 13. In the operational position 11, the light incidence surface 17 consequently corresponds to the area of the input coupling region 14. Consequently, the light can be transmitted from the surroundings to the image capture device 26, for example as described in relation to FIG. 1 and FIG. 2.

Overall, the examples show how a holocam capable of being rolled up can be provided by way of the disclosure.

A description has been provided with reference to example embodiments thereof and examples, but it will be understood that variations and modifications can be effected within the spirit and scope of the claims which may include the phrase "at least one of A, B, and C" as an alternative expression that means one or more of A, B, and C may be used, contrary to the holding in *Superguide* v. *DIRECTV,* 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The invention claimed is:

1. A camera apparatus for generating an image representation of a surroundings, comprising:
    a carrier medium configured as a light guide and on which an input coupling region and an output coupling region are disposed, the carrier medium being flexible, at least in regions, in a region of the input coupling region, wherein
    an area of the input coupling region is greater than an area of the output coupling region,
    the input coupling region includes a first deflection structure which is configured to input light, which is incident on the first deflection structure from the surroundings, into the carrier medium,
    the carrier medium is configured to transmit the light input via the input coupling region, by internal reflection from the input coupling region to the output coupling region, and
    the output coupling region includes a second deflection structure, which is configured to output the light transmitted by internal reflection, which is incident on the second deflection structure, from the carrier medium; and
    an image capture device, disposed adjacent to the output coupling region, configured to capture the light that has been output from the carrier medium via the output coupling region and to provide the light in a form of image data which are correlated with the light from the surroundings.

2. The camera apparatus as claimed in claim 1, further comprising:
    a stowing device, on which the carrier medium is disposed and which is configured to deform at least a flexible portion of the carrier medium to alternate the carrier medium between a compact position, in which the carrier medium is folded up or rolled up, and an operational position, in which the carrier medium is unfolded or unrolled,
    wherein
    the carrier medium in the operational position has a larger light incidence surface for the light, which is incident on the first deflection structure from the surroundings, than in the compact position.

3. The camera apparatus as claimed in claim 2, wherein the stowing device includes a support structure having a material configured to lock the flexible portion of the carrier medium in the operational position at a first value corresponding to at least one of a temperature, an electric field, and a magnetic field and to lock the flexible portion in the compact position at a second value corresponding to at least one of the temperature, the electric field, and the magnetic field.

4. The camera apparatus as claimed in claim 2, wherein the stowing device includes a guide mechanism configured to roll up or fold up the carrier medium to position the carrier medium in the compact position and to unroll or unfold the carrier medium to position the carrier medium in the operational position.

5. The camera apparatus as claimed in claim 1, wherein the carrier medium is configured as a plate made of polymer or as a film.

6. The camera apparatus as claimed in claim 5, wherein the carrier medium is transparent.

7. The camera apparatus as claimed in claim 1, wherein
the input coupling region includes at least one optical grating as the first deflection structure, and
the output coupling region includes at least one optical grating as the second deflection structure.

8. The camera apparatus as claimed in claim 7, wherein
the at least one optical grating of the input coupling region includes a surface holographic grating or a volume holographic grating, and
the at least one optical grating of the output coupling region includes the surface holographic grating or the volume holographic grating.

9. The camera apparatus as claimed in claim 1, wherein
the input coupling region and the output coupling region are formed as one piece with the carrier medium, or
the carrier medium is formed as a separate element from the input coupling region and the output coupling region.

10. The camera apparatus as claimed in claim 1, wherein the area of the input coupling region is greater than the area of the output coupling region by a factor of 2.

11. The camera apparatus as claimed in claim 1, further comprising a holographic optical element disposed between the input coupling region and the output coupling region in a longitudinal direction of the carrier medium, wherein the light input via the input coupling region, by internal reflection from the input coupling region to the output coupling region, passes through the holographic optical element, the carrier medium includes first polymer plate disposed on a first side of the input coupling region and the output coupling region and a second polymer plate disposed on a second side of the input coupling region and the output coupling region, and the holographic optical element has a same refractive index as the first and second polymer plates.

12. The camera apparatus as claimed in claim 11, wherein at least a portion of the holographic optical element is flexible.

* * * * *